United States Patent [19]
Suman et al.

[11] Patent Number: 5,822,023
[45] Date of Patent: Oct. 13, 1998

[54] PROJECTED DISPLAY SYSTEM FOR A VEHICLE

[75] Inventors: Michael J. Suman; Thomas L. Welling, both of Holland; Robert J. Schneider, Fennville, all of Mich.

[73] Assignee: Prince Corporation, Holland, Mich.

[21] Appl. No.: 25,189

[22] Filed: Mar. 2, 1993

[51] Int. Cl.$^6$ .................................................. H04N 7/18
[52] U.S. Cl. ........................................................ 348/837
[58] Field of Search ..................................... 358/254, 103, 358/108, 93; 345/905, 901, 7, 8; 348/837, 838, 839, 840, 841, 842, 843, 836

[56] References Cited

U.S. PATENT DOCUMENTS

| | | | |
|---|---|---|---|
| 2,299,393 | 10/1942 | Johnson et al. | 348/842 |
| 2,482,031 | 9/1949 | Rose | 348/842 |
| 4,589,659 | 5/1986 | Yokoi et al. | 345/7 |
| 4,719,513 | 1/1988 | Peterson | 348/838 |
| 4,843,477 | 6/1989 | Mizutani et al. | 358/254 |
| 4,908,611 | 3/1990 | Iino | 345/7 |
| 4,953,305 | 9/1990 | Van Lente et al. | |
| 4,983,951 | 1/1991 | Igarashi et al. | 340/461 |
| 5,061,996 | 10/1991 | Schiffman | |
| 5,096,271 | 3/1992 | Portman | 312/7.2 |
| 5,123,728 | 6/1992 | Gradin et al. | |
| 5,161,028 | 11/1992 | Kawata et al. | 348/837 |
| 5,173,686 | 12/1992 | Fujihara | 341/700 |
| 5,179,447 | 1/1993 | Lain | 348/837 |

FOREIGN PATENT DOCUMENTS

| | | |
|---|---|---|
| 0131988 | 6/1984 | European Pat. Off. |
| 2544675 | 4/1983 | France . |
| 4118711 | 12/1992 | Germany ............... B60R 11/02 |
| 6051087 | 3/1985 | Japan ................................. 358/254 |
| 6051088 | 3/1985 | Japan ................................. 358/254 |
| 63-219440 | 9/1988 | Japan . |

OTHER PUBLICATIONS

Soviero, Marcelle M., TV for Cars, *Popular Science*, Dec. 1990, pp. 88, 89.

*Primary Examiner*—Bryan Tung
*Attorney, Agent, or Firm*—Price, Heneveld, Cooper, DeWitt & Litton

[57] ABSTRACT

A projection system for projecting television images in a vehicle including a console for mounting to the roof of a vehicle with a housing in which a video projector for television signals is fixedly mounted. The console further includes a cover which is pivotally mounted to the housing at its forward end for movement between a closed position, substantially enclosing the projector, and an open position. A projection screen is movably mounted to the housing to move the screen between a substantially horizontal stored position within the cover and housing, and a substantially vertical use position when the cover is opened. The console further includes, in a preferred embodiment, light blocking panels coupled between the cover and housing for enclosing the sides of the space between the projector and screen for providing a dark environment between the projector and the surface of the screen facing the projector.

47 Claims, 4 Drawing Sheets

PROJECTED DISPLAY SYSTEM FOR A VEHICLE

BACKGROUND OF THE INVENTION

The present invention relates to a vehicle television display and particularly to an overhead mounted projection system for displaying video television format information within a vehicle.

There have been several systems available for use in connection with limousines, mini-vans, van conversions and motor homes which provide small screen conventional televisions within a vehicle overhead console for use by rear seat passengers for either watching television broadcast signals or for watching a video tape through a VCR connected to the television. More recent installations have included relatively small and expensive color LCD flat screen displays which can be pivoted down from a raised horizontal stored position within a vehicle overhead console to a lowered, generally vertically extending, use position.

The disadvantage of such an LCD direct display is that it is very expensive and is limited to a relatively small picture display which cannot be easily viewed by rear seat passengers. Larger sized LCD video displays are not currently commercially available and prototype models are extremely expensive. Conventional CRT display tubes of significant size are too large for storage in the overhead of smaller vehicles such as conventional automobiles even though relatively small CRT's have been used in, for example, limousines, motor homes and vans. As a result, economical larger screen television displays have not been generally available for vehicles such as automobiles.

SUMMARY OF THE INVENTION

The system of the present invention, however, provides an economical, larger video display by providing a projection system in which a compact, relatively flat, video projector is fixedly mounted in a vehicle overhead console and a flat, rectangular projection screen is movably mounted to the console to move between a generally horizontal stored position in the console and a lowered, generally vertical, use position in spaced alignment from the projector for providing a television raster-type display for vehicles. The small projector and movable mounting system for the projection screen allows for compact unobtrusive storage of the display system when not in use, and yet provides a bright, relatively larger, viewable screen when in use. The projector is coupled to television signals from sources such as a television tuner, a VCR or other NTSC video signal source, such as video games which can be mounted in the door panels or floor consoles for easy access by rear seat passengers.

Projection systems embodying the present invention include a console for mounting to the roof of a vehicle with a housing in which a video projector for television signals is fixedly mounted. The console further includes a cover for selectively enclosing the lower end of the housing and movable between a closed position, substantially enclosing the projector, and an open position. A projection screen and means for movably mounting the screen to the housing and cover allow movement of the screen between a substantially horizontal stored position within the cover and housing, and a substantially vertical use position when the cover is opened.

The console further includes, in a preferred embodiment, light blocking means coupled between the cover and housing for enclosing the sides of the space between the projector and screen for providing a dark environment between the projector and the surface of the screen facing the projector. In one embodiment of the present invention, the enclosing means are pivoted panels, and in another embodiment comprise flexible fabric. Both systems collapse to a stored position within the housing when the cover is moved to the closed position.

These and other features, objects and advantages of the present invention will best be understood by reference to the following description thereof together with the accompanying drawings in which:

DETAILED DESCRIPTION OF THE PREFERRED EMBODIMENT

Figure 1:
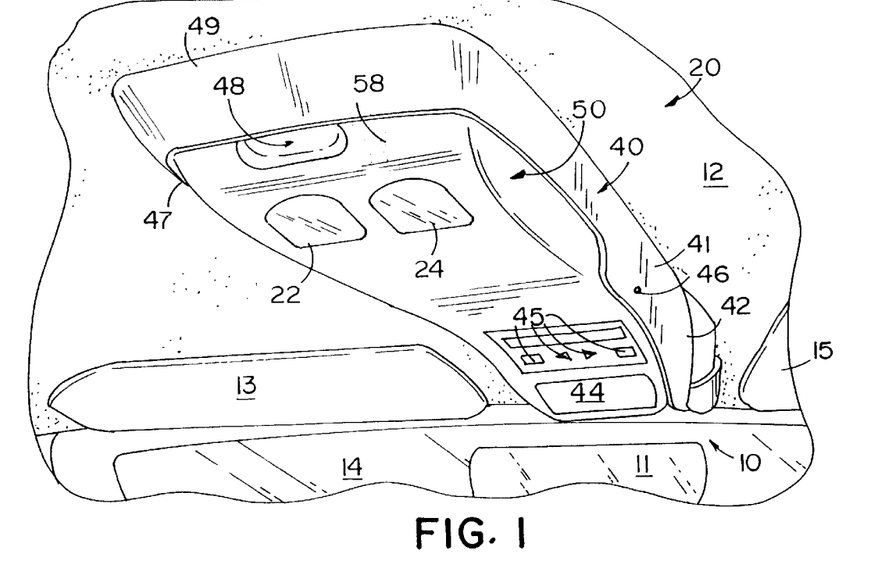
FIG. 1 is a fragmentary perspective view of a vehicle including a projection system embodying the present invention shown in a stored position.

Referring initially to FIG. 1, there is shown a vehicle 10 such as an automobile and particularly the overhead or roof area 12 of the vehicle looking toward the front windshield 14 from the rear seat area. The vehicle may include a rear view mirror 11 mounted in the central upper area of the windshield and a pair of visors 13 and 15 mounted to the roof 12 on the driver and passenger sides respectively.

Figure 2:
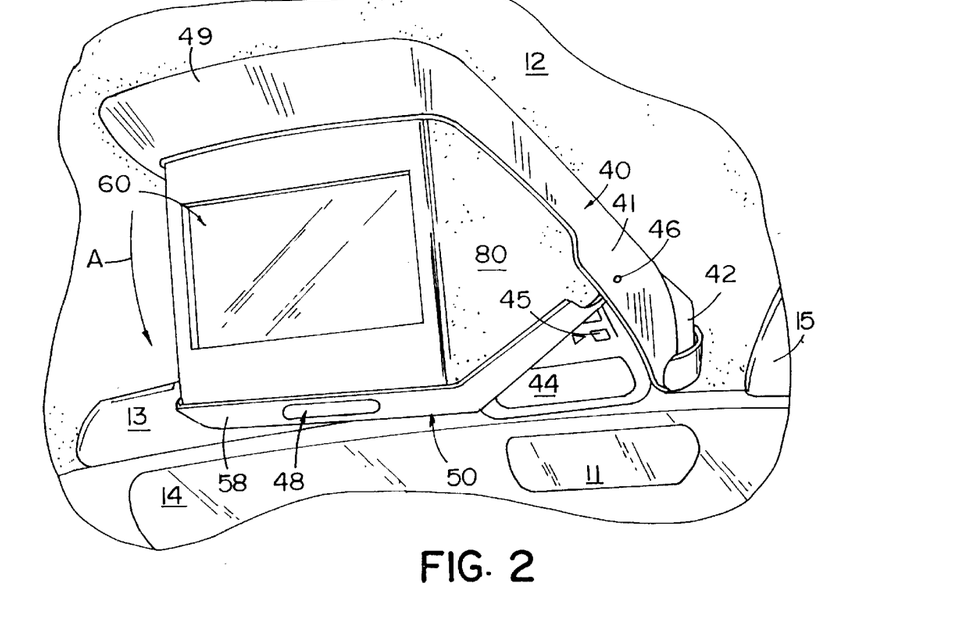
FIG. 2 is a fragmentary perspective view of the system of FIG. 1 shown in a use position.

Mounted to the roof of the vehicle and between the visors is a console 20 embodying the present invention. The console 20 is an elongated, generally rectangular structure mounted with its longitudinal axis extending along the center line of the vehicle as shown. The console includes a housing 40 to which there is pivotally mounted a cover 50 which can be selectively lowered as seen in FIG. 2 to expose a rear facing projection screen 60 for a television video projector 70 (FIG. 7) which is mounted within the housing 40 near the forward end 42 thereof. The housing 40 can be mounted to the roof of the vehicle using a plurality of spaced conventional fasteners such as shown at 106 and 108 in FIG. 7.

Mounted in the forward end 42 of housing 40 may be a variety of vehicle options such as a digital, alphanumeric display 44 for an electrical compass 43 (FIG. 7) and suitable control switches 45 for providing compass display information on the LCD or vacuum fluorescent display 44. Display 44 may also be employed to display temperature or other vehicle operating parameter information. For such purpose, the console 20 is mounted to the vehicle with display 44 near the windshield 14 and readily visible to the driver while the projection screen 60, for the television-type (i.e. raster) display is visible only to the rear seat passengers. A compass system suitable for mounting within the console 20 and housing 40 thereof is disclosed in U.S. Pat. No. 4,953,305 issued on Sep. 4, 1990 and entitled VEHICLE COMPASS WITH AUTOMATIC CONTINUOUS CALIBRATION and assigned to the present assignee.

Cover 50 is pivotally mounted between side walls 41 and 47 of the housing 40 by means of pivot pins 46 with a conventional latch assembly 48 mounted to the rear edge 58 of cover 50 and engaging a catch mounted to the inner edge of rear wall 49 of housing 44, releasing the cover from its raised, latched and stored position shown in FIG. 1 to allow its downward movement in a direction indicated by arrow A in FIGS. 2–5 for use of the projector.

The console 20 may also include a pair of courtesy lights 22 and 24 mounted to the cover 50 near its rear edge 58 such that when the cover is closed in a raised stored position, as shown in FIG. 1, the console with the courtesy lights 22 and 24 coupled to the vehicle's electrical system conveniently provides overhead courtesy lights from the console 20.

Figures 3, 4, 5, 6:
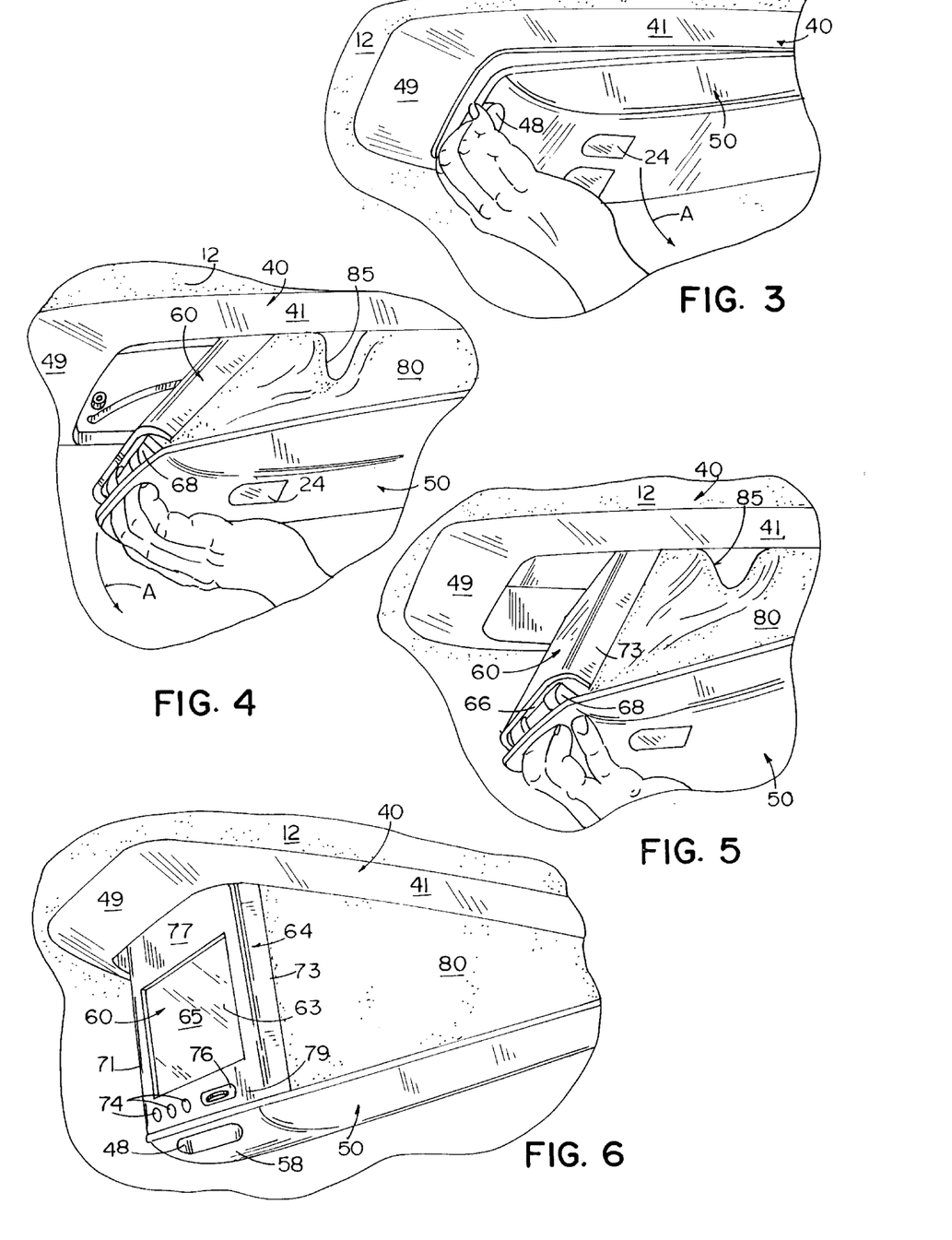
FIG. 3 is a fragmentary perspective view showing the unlatching of the cover for the lowering of the projection system from the stored position shown in FIG. 1 to the use position shown in FIG. 2.
FIG. 4 is a fragmentary perspective view showing the movement of the projection screen from the stored position toward the use position.
FIG. 5 is a fragmentary perspective view showing the progressive movement of the projection screen from the stored position toward the use position.
FIG. 6 is a perspective view of the projection screen and light blocking structure shown in the use position.
Figures 7, 12, 13:
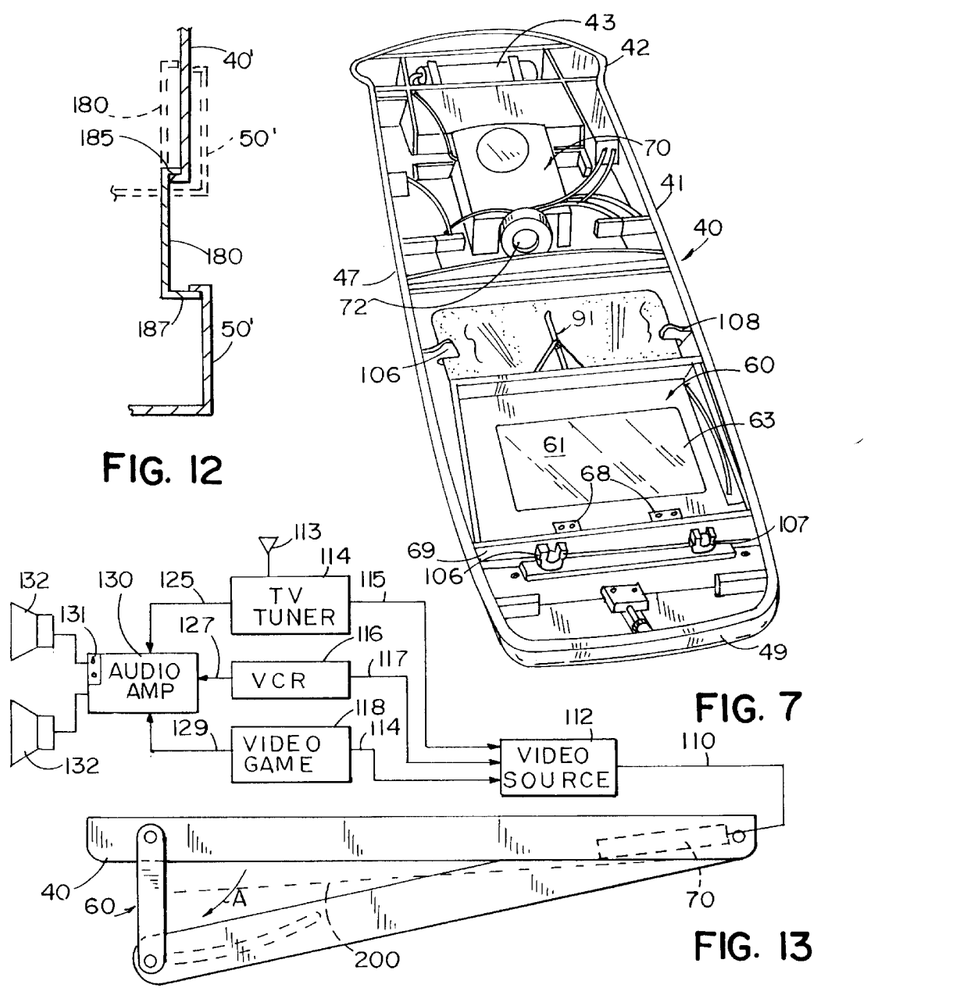
FIG. 7 is a top perspective view of the console shown removed from the vehicle and including the projector and movable screen of the present invention.
FIG. 12 is an enlarged cross-sectional view of one side of the structure shown in FIG. 11 taken along section line XII—XII of FIG. 11.
FIG. 13 is a schematic and block diagram view of the electrical and projection system of the present invention.
Figures 9, 10:
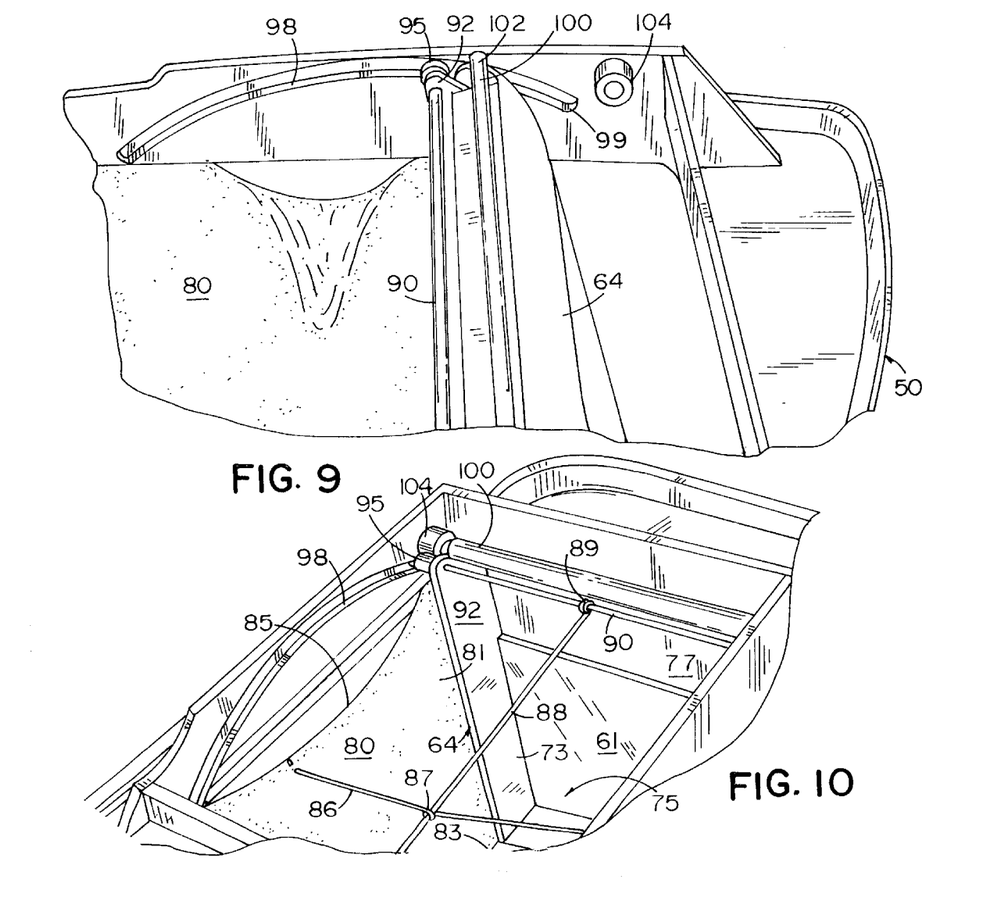
FIG. 9 is an enlarged, fragmentary, perspective view of the screen and mounting structure shown in a nearly fully extended use position.
FIG. 10 is an enlarged, fragmentary, rear facing, top perspective view showing the inside of the console with the screen in its fully extended use position.

As cover 50 is unlatched from housing 40 and lowered progressively, as illustrated in FIGS. 3–6, means coupling the projection screen 60 between the housing and cover allow the screen assembly 60 to be moved from a substantially horizontal stored position as seen in FIG. 7 within the housing, to a substantially vertical use position shown in FIGS. 2, 6, and 10. Before describing the means for mounting the screen between the cover and housing to achieve this function, it is briefly noted that in the first embodiment shown in FIGS. 3–6, the screen assembly 60 is pivotally mounted at its lower edge to the rear edge 58 of cover 50 and is controllably guided by slot means in the inner walls of the sides of housing 40 such that lowering of the cover urges the screen from its horizontal position to its vertical use position. In the FIGS. 11 and 12 embodiment, this mounting arrangement is reversed as described below.

In the lowered use position shown in FIGS. 2, 6, and 10, projected light 200 (FIG. 13) from lens 72 of the video projector 70 (FIG. 7) is transmitted through an enclosed darkened cavity 75 (FIG. 10) of the console for projecting a television image directly onto the rear surface 61 of the projection screen 63. The cavity is enclosed from incident ambient light by side panel means 80 and 82 on each of the sides, such that light from the projector 70 will provide a bright image to the user on the projection screen 63. Having briefly described the overall concept of applicant's invention, a more detailed description, particularly of the mounting of the screen assembly between the cover and housing is presented in connection with FIGS. 4–10.

Referring initially to FIG. 6, it is seen that the screen assembly 60 includes a generally molded polymeric frame 64 with vertically extending sides 71 and 73, a top edge 77 and a bottom edge 79 into which a translucent rectangular screen 63 is mounted. Screen 63 has a rear surface 61 which may have a suitably textured surface, such as a lenticular pattern or by being sandblasted, for providing a bright, clear image to the viewer of the opposite or front surface 65 of screen 63. The frame 64 may include controls for the video projector 70 such as power on and off and other control switches 74 and a contrast control knob 76 which are mounted to the lower edge 79 of frame 64 and coupled electrically to the projector 70 by conventional electrical conductors (not shown).

The lower edge 79 of frame 64 includes a pair of spaced pivot hinges 68, which pivotally couples the frame and screen 63 therein, to an inner transversely extending support wall 69 extending between the sides 41 and 47 of housing 40 as best seen in FIG. 7. This allows the screen assembly 60 to pivot from the horizontal stored position shown in FIG. 7 to a raised, generally vertically extending position, as seen in FIGS. 2 and 6.

Mounted to the top of frame 64 between sides 71 and 73 is a transversly extending guide rod 90 (FIGS. 8–10) which extends between upper forwardly located extensions 92 of the sides of frame 64. Rod 90 extends through apertures in extensions 92 on each side of the frame 64 and includes guide rollers 95 at its ends. Rollers 95 fit within arcuate slots 98 formed on the inside of walls 41 and 47 of the housing 40 such that, as the cover 50 is lowered in a direction indicated by arrow A in the Figs., the upper edge 77 of the screen assembly 60 is drawn rearwardly by the guide rollers 95 extending in the arcuate tracks 98 on each side, to stabilize and control the motion of the screen assembly as it moves into a generally vertical position as the lower edge 79 pivots on hinges 68.

Extending along the top 77 of frame 64 in parallel spaced relationship to guide rod 90 is a locking bar 100 having ends 102, which ride over a compressible circular stop 104 mounted to the inside surface of each of the side walls 41 and 47 of housing in an over-center snap locking relationship for releasably holding the screen assembly in a lowered use position once the cover has been fully opened, and yet allowing the cover to be closed by urging the rear end 58 upwardly in a direction opposite arrow A in the Figures. For such purpose, rod 100 is spaced from rod 90 a distance such that ends 102 will ride on a side of the circular rubber stop member 104 opposite the stop-forming ends 99 of tracks 98 with the guide member 95 substantially butting the end 99 of the guide track, as seen in FIG. 10.

Figure 8:
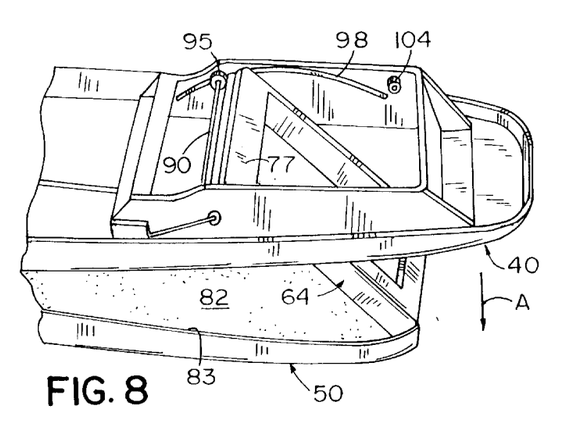
FIG. 8 is an enlarged, fragmentary, top perspective view of the screen mounting mechanism shown also in FIGS. 4, 5, and 7 shown with the screen in a partly extended position.

Coupled to the sides 71 and 73 of frame 64 in the embodiment shown in FIGS. 1–10 are flexible generally triangular black light opaque fabric panels 80 and 82 which are collapsed, as best seen in FIGS. 4 and 5, when the screen is in a stored position but which unfold to fill in the triangular sides of the projection system when fully opened. The flexible fabric panels 80 and 82 effectively block ambient light from entering the cavity 75 to provide a bright image to the viewer. Each of the panels 80 and 82 include a forward edge 81 (FIG. 10) which is attached to the sides 71 and 73 of the projection screen frame 64 on a continuous line extending the height of the frame. The flexible fabric similarly is coupled at its lower edges 83 to the upper inner edges of cover 50 as also seen in FIGS. 8 and 10. The upper edges 85 of flexible panels 80 and 82, however, include a welt not attached to the housing 40 to allow the fabric to collapse within the housing and cover with the pivoting closing movement of the projection screen assembly 60. The flexible material unfolds to fill in the sides as best seen in FIGS. 4 and 5, when the screen is lowered for use.

In order to ensure that the fabric sides 80 and 82 fully raise and enclose the interior projecting space within the housing between the projector and screen, a flexible wire 86 (FIG. 10) extends between the top edges 85 of fabric panels 80 and 82 approximately at the midway position of the longitudinal axis of the projection housing. Wire 86 includes a loop 87 surrounding a flexible control cord 88 which is anchored at its rearward end 89 to the center of rod 90 as seen in FIG. 10, and at its forward end 89' to the housing as seen in FIG. 7. When the screen 60 is in an extended position, cord 88 becomes taut thereby raising wire 86 to a horizontal position at the top of the projection area within the housing and cover near the lower edge of the housing and above the projected image area of the system. This assures the flexible fabric side panels 80 and 82 are fully raised and prevent light from leaking within the interior space of the projection area. In some embodiments, such as the preferred embodiment shown in FIGS. 11 and 12 one or more pivoted, rigid, side panels are employed making this additional structure unnecessary.

The projector 70 is a relatively compact flat rectangular projector which projects through a small selective multi-color light transmitting LCD chip modulated with NTSC video signals and using a high intensity light source. The projector in the preferred embodiment is a model P-40U projector comercially available from Fujix, and integrally includes the electrical circuitry for processing NTSC signals and modulating the LCD chip. The projector includes a lens 72 (FIG. 7) for the rear projection of the television image onto a screen, such as the screen 63 of the present invention. The focal length of the projection lens can be adjusted and depending on the length of the housing for console 20, the screen 60 can take on a variety of sizes. In the compact system shown in the Figures of the present invention, the screen size was 6 inches along the diagonal although this represents approximately the smallest size available with this particular projector. By elongating the housing somewhat and/or moving the projector forwardly and eliminating the electrical compass display, larger screens can be provided. Naturally, for larger vehicles such as vans and motor homes, the screen size can be increased significantly without additional significant expense. In such modifications it will be apparent that the rear end of the console would be enlarged to accommodate the larger screen size. The projector 70 can be modified by eliminating the audio components of the commercially available projector and utilizing the vehicle's own audio system, as seen in the block and schematic diagram of FIG. 13 as described below.

Figure 11:
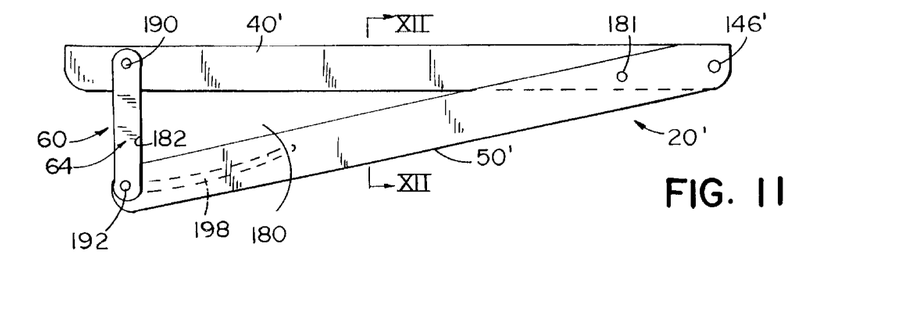
FIG. 11 is a side elevational view of an alternative embodiment of the projection system of the present invention shown in a use position.

Referring now to FIGS. 11 and 12, there is shown an alternative and preferred embodiment of the invention in which the flexible sides 80 and 82 are replaced with a housing 40' which is somewhat vertically deeper than the housing 40 of the previous embodiment and a cover 50' which likewise is somewhat deeper than cover 50 of the previous embodiment. In order to block light from the triangular areas between the lower edge of housing 401 and the upper edge of cover 50', at least one thin, triangular panel 180 (on opposite sides of the console) is provided. Each of the panels 180 are pivotally coupled by a pivot connection 181 to the housing 40' near the forward end thereof and in spaced relationship to the pivot connection 146' of cover 50' to housing 40'. As the cover 50' is moved to a lowered use position the thin panels 180 on each side of the console extend from their overlapping compact relationship within the console 20'. As best seen in the vertical, cross-sectional view of FIG. 12, the side panel 180 is nested within the housing 40' and cover 50' and includes interengaging upper and lower outwardly extending lips 185 and 187 respectively, which engage inwardly extending ledges in the cover 50' and housing 40' in the extended position. The front edge 182 of the panels may be slidably mounted to a vertically extending groove formed in the forward facing side walls of the frame 64 of projection screen 60 to maintain the alignment of the side panels 180 with respect to the screen as the panels pivot between the compact stored position and the lowered use position.

The side panels 180 may include a single panel in some embodiments or overlapping leaf-type multiple panels slidably interconnected in a conventional manner for larger sized projection screens with a larger triangular side area which must be blocked against incident light for use of the projection system during daylight hours. In the embodiment shown in FIGS. 11 and 12, the screen frame 64 is pivotally mounted by spaced hinges 190 at its upper end to the housing 40' and a guide rod 192 at its lower edge has ends which extend within an arcuate slot 198 on the inside of cover 50' in reverse relationship to the structure shown in the embodiments in FIGS. 4–10, such that the screen pivots from the top and pivots and slides at the bottom as opposed to pivoting at the bottom and sliding at the top, as in the previous embodiment. The embodiment shown in FIGS. 11 and 12 allow the use of a relatively larger screen which does not project downwardly from the lower edge of the housing 40' as far as the system shown in the earlier embodiment. In the event of an impact force at the lower corner of the projection screen, this embodiment will collapse more readily for safety purposes.

Cover 50' may include a latch similar to the latch used in the earlier embodiment for holding the cover closed in a stored position when not in use, thus having a substantially identical appearance as shown in FIG. 1. The embodiment shown in FIGS. 11 and 12 thus reverses the mounting of the screen providing the pivoted mounting of the screen at its upper end to the housing while the lower end rides within the track of the cover such that the screen pivots forwardly and upwardly from its lower end as it is moved to a stored position.

Referring now to FIG. 13, it is seen that the projector 70 receives NTSC video signals from a desired source and projects these signals onto the rear projection screen. The screen 60 shown in the schematic diagram of FIG. 13 pivots downwardly, as in the embodiment shown in FIGS. 11 and 12, from the housing. Projector 70 is mounted at a suitable angle in the housing such that its lens 72 focuses on the screen. Light is projected along a pathway 200, shown in dotted lines in FIG. 13, in a darkened environment provided by the sides 80 and 82 in the embodiment shown in FIGS. 3–6 or the shutter-type side panels 180 described in connection with FIGS. 11 and 12.

The NTSC signals provided to projector 70 and supplied by a video cable 110 which can be trained underneath the vehicle headliner and coupled to the output of a video source selector switch 112. In the embodiment shown, switch 112 is a three position switch with three inputs for coupling any one of the inputs to output cable 110. One of the inputs to switch 112 is provided by conductor 115 coupled to the output of a TV tuner 114 coupled to a television receiving antenna 113. A second switch input is coupled by conductor 117 to the video output of a compact VCR 116. The video output from a video game 118 is coupled to the third input of switch 112 by conductor 119. The audio outputs from each of these sources 114, 116, and 118 can be conventionally coupled to the speaker system existent in the vehicle or to a separate audio system for rear seat use only. Thus, the audio outputs 125, 127, and 129 of the sources 114, 116, 118 may be coupled to an audio amplifier 130 which is coupled to the vehicle's speaker system or its own speaker system as represented schematically by the speakers 132 in FIG. 13.

Alternatively, the audio amplifier 130 includes headphone jacks 131 such that headphones (not shown) can be employed to listen to the audio portion of the entertainment provided by the television projection system of the present invention so as not to distract the vehicle driver. Each of the components 114, 116, 118, and 130 can be mounted within a floor console at the center of the vehicle rear seat area for convenient use by either of the rear seat passengers, in one of the side doors of the vehicle, or at another suitable location. The television tuner 114 and VCR 116 may be an integral unit having its own infrared remote control to allow even more convenient use by the passengers.

With the system of the present invention therefore, the rear seat passengers are provided with a television viewing system which allows entertainment of the rear seat passengers, such as children, during long trips without distracting the vehicle operator and providing them with a relatively large screen television which is easily viewable. The utilization of a projection system which is now commercially available at relatively low cost, as compared to direct view LCD panels, economically provides a relatively large screen display. The movable mounting of the screen provides a safe system for use in vehicles and one which can be readily stored when not in use so as to be used as a normal overhead console, and prevent any distraction whatsoever to the vehicle operator.

It will become apparent to those skilled in the art that various modifications to the preferred embodiments of the invention described herein can be made without departing from the spirit or scope thereof as defined by the appended claims.

The embodiments of the invention in which an exclusive property or privilege is claimed are defined as follows:

1. A system for the projected display of television signals in a vehicle overhead console comprising:
   a housing for mounting to the roof of a vehicle, said housing including a television signal projector fixedly mounted therein and including a lens to project a television image rearwardly with respect to the vehicle;
   a cover mounted to said housing for movement between a closed position and an open position for use of said projector; and
   a projection screen and means for movably mounting said screen to said housing for movement between a substantially horizontal stored position when said cover is closed and a substantially vertical position in spaced relationship to said lens when said cover is open for use of said projector.

2. The system as defined in claim 1 wherein said cover is pivotally mounted to said housing near a forward end of said housing.

3. The system as defined in claim 2 wherein said means for movably mounting said screen to said housing comprises pivot means coupling an upper edge of said screen to said housing.

4. The system as defined in claim 3 wherein said means for movably mounting said screen to said housing further includes pin means extending from a lower edge of said screen and wherein said cover includes a slot means into which said pin means extends for guiding said lower end of said screen to urge said screen to a raised position as said cover is moved from said open position to said closed position and for urging said screen to a lower position as said cover is moved from said closed position to said open position.

5. The system as defined in claim 2 wherein said means for movably mounting said screen to said housing comprises pivot means coupling a lower edge of said screen to said cover near a rear end of said cover.

6. The system as defined in claim 5 wherein said means for movably mounting said screen to said housing further includes pin means extending from an upper edge of said screen and wherein said housing includes a slot means into which said pin means extends for guiding said upper end of said screen to urge said upper end of said screen to a forward position as said cover is moved from said open position to said closed position and for urging said upper end of said screen to a rearward position as said cover is moved from said closed position to said open position.

7. The system as defined in claim 1 and further including sidewall means extending between said screen, said cover, and said housing for blocking ambient light when said cover is in said open position.

8. The system as defined in claim 7 wherein said sidewall means comprises rigid panel means and means for movably mounting said rigid panel means between said housing and said cover for extending said panel means to fill in the gap between said housing and said cover when said cover is opened.

9. The system as defined in claim 7 wherein said sidewall means comprises flexible panels mounted between said cover and said housing, said flexible panels collapsing when said cover is closed and extending when said cover is opened to fill in the gap between said housing and said cover when said cover is opened.

10. An overhead console for the projected display of television signals in a vehicle, said console comprising:
    an elongated housing having a forward end for mounting to the front roof area of a vehicle and extending rearwardly, said housing including a television signal projector mounted therein, said projector including a lens to project a television image rearwardly with respect to the vehicle;
    a cover pivotally mounted near the forward end of said housing for movement between a closed position and an open position for use of said projector; and
    a projection screen and means for movably mounting said screen to said housing and said cover for movement between a substantially horizontal stored position when said cover is closed and a substantially vertical position aligned with said projector in spaced relationship to said lens when said cover is open for use of said projector.

11. The system as defined in claim 10 wherein said screen is pivotally mounted at one of a top edge and a bottom edge to one of said housing and said cover and slideably mounted at the other of said top edge and said bottom edge to the other of said housing and said cover.

12. The system as defined in claim 11 and further including sidewall means movably coupled to said cover for covering the gap between said cover and said housing when said cover is in said open position to block ambient light from impinging on said screen on a side toward said projector.

13. The system as defined in claim 12 and further including a source of video signals to be displayed by said screen, said source coupled to said projector.

14. The system as defined in claim 13 wherein said source comprises a television tuner.

15. The system as defined in claim 13 wherein said source comprises a VCR.

16. The system as defined in claim 13 wherein said source comprises a video game.

17. A projection system for the display of television signals in a vehicle, said system comprising:
   a console including an elongated housing and a cover for said housing, said housing adapted to be mounted to the roof of a vehicle;
   a television signal projector mounted in said housing and including a lens to project a television image along the longitudinal axis of said housing;
   means for pivotally mounting said cover to said housing for movement between a closed position and an open position for use of said projector; and
   a projection screen and means for movably mounting said screen to said housing and to said cover for movement between a substantially horizontal stored position when said cover is closed and a substantially vertical position aligned with said projector in spaced relationship to said lens when said cover is open for use of said projector.

18. The system as defined in claim 17 wherein said means for movably mounting said screen to said housing comprises means for pivotally mounting said screen to said housing.

19. The system as defined in claim 18 wherein an edge of said screen opposite an edge of said screen pivotally mounted to said housing is coupled to said cover for guided movement of said screen as said cover is moved.

20. The system as defined in claim 19 and further including side panels movably coupled to said housing to fill in the sides from said screen toward said projector when said cover is pivoted to said open position.

21. The system as defined in claim 17 and further including flexible side panels movably coupled between said screen and said housing to fill in the sides from said screen toward said projector when said cover is pivoted to said open position, and means coupled to said screen and to said flexible side panels for extending said side panels when said screen is moved to a use position.

22. A system for the projected display of television signals in a vehicle comprising:
   a housing for mounting to the roof of a vehicle, said housing defining a light tight enclosure including a television signal projector having a lens, said projector mounted in fixed relationship to said housing to project a television image rearwardly with respect to the vehicle; and
   a projection screen mounted to said housing in spaced relationship directly opposite said lens of said projector for display of projected television images.

23. A system for the projected display of television signals in a vehicle comprising:
   an elongated housing for mounting to a vehicle, said housing including a television signal projector mounted near one end of said elongated housing to project a television image in a straight line in a direction along the length of said housing toward an opposite end of said housing;
   a cover mounted to said housing for movement between a closed position and an open position for use of said projector; and
   a projection screen mounted to said housing near said opposite end for movement between a stored position when said cover is in said closed position and a use position generally orthogonal to said straight line when said cover is in said open position for use of said projector such that the projected television image is projected directly from said projector onto said screen.

24. The system as defined in claim 23 and further including sidewalls movably coupled to said cover for covering the gap between said cover, said screen, and said housing when said cover is in said open position.

25. The system as defined in claim 24 wherein said sidewalls comprise rigid panels and means for movably mounting said rigid panels between said housing and said cover for extending said panels to fill in the gap between said housing and said cover when said cover is moved to said open position.

26. The system as defined in claim 24 wherein said sidewalls comprise flexible panels mounted between said screen, said cover, and said housing for collapsing when said cover is mounted to said closed position and extending when said cover is moved to said open position to fill in the gap between said screen, said housing, and said cover when said cover is moved to said open position.

27. The system as defined in claim 23 and further including a source of video signals to be displayed on said screen, said source coupled to said projector.

28. The system as defined in claim 27 wherein said source comprises a television tuner.

29. The system as defined in claim 27 wherein said source comprises a VCR.

30. The system as defined in claim 27 wherein said source comprises a video game.

31. The system as defined in claim 23 wherein said screen is mounted in a frame which is pivotally mounted to one of said cover and said housing, and wherein said housing includes attachment means for securing said housing to the roof of a vehicle such that said housing can be aligned with the centerline of the vehicle with said screen facing rearwardly in said vehicle.

32. The system as defined in claim 31 and further including flexible side panels movably coupled to said housing to fill in the sides from said screen toward said cover and said projector when said cover is moved to said open position, and means coupled to said frame and to said flexible side panels for extending said side panels when said screen is moved to said use position.

33. A system for the projected display of television signals in a vehicle comprising:
   a housing for mounting to a vehicle, said housing including a television signal projector mounted near one end of said elongated housing to project a television image toward an opposite end of said housing;
   a cover mounted to said housing for movement between a closed position and an open position for use of said projector;
   a projection screen mounted to said housing near said opposite end for movement between a stored position when said cover is in said closed position and a use position aligned with said projector when said cover is in said open position for use of said projector; and
   walls extending between said cover and said housing for blocking light when said cover is in said open position.

34. The system as defined in claim 33 wherein said walls comprise rigid panels and means for movably mounting said rigid panels between said housing and said cover for extending said panels to fill in the gap between said housing and said cover when said cover is moved to said open position.

35. The system as defined in claim 33 wherein said walls comprise flexible panels mounted between said screen, said cover, and said housing for collapsing when said cover is mounted to said closed position and extending when said cover is moved to said open position to fill in the gap between said screen, said housing, and said cover when said cover is moved to said open position.

36. The system as defined in claim 35 wherein said screen is mounted in a frame which is pivotally mounted to one of said cover and said housing, and wherein said housing includes attachment means for securing said housing to the roof of a vehicle such that said housing can be aligned with the centerline of the vehicle with said screen facing rearwardly in said vehicle.

37. The system as defined in claim 36 and further including means coupled to said frame and to said flexible panels for extending said panels when said screen is moved to said use position.

38. The system as defined in claim 37 and further including a source of video signals to be displayed on said screen, said source coupled to said projector.

39. The system as defined in claim 38 wherein said source comprises a television tuner.

40. The system as defined in claim 39 wherein said source comprises a VCR.

41. The system as defined in claim 40 wherein said source comprises a video game.

42. A system for the projected display of television signals in a vehicle comprising:

an elongated housing including attachment structure for mounting said housing to a vehicle, said housing including a television signal projector mounted near one end of said elongated housing to project a television image in a straight line in a direction along the length of said housing toward an opposite end of said housing;

a cover mounted to said housing for movement between a closed position and an open position for use in said projector;

a projection screen mounted to said housing near said opposite end for movement between a stored position when said cover is closed and a use position generally orthogonal to said straight line when said cover is open for use of said projector such that the projected television image is projected directly from said projector onto said screen; and walls extending between said cover and said housing for blocking light when said cover is in said open position.

43. The system as defined in claim 42 wherein said walls comprise rigid panels and means for movably mounting said rigid panels between said housing and said cover for extending said panels to fill in the gap between said housing and said cover when said cover is moved to said open position.

44. The system as defined in claim 42 wherein said walls comprise flexible panels mounted between said screen said cover, and said housing for collapsing when said cover is moved to said closed position and extending when said cover is moved to said open position to fill in the gap between said screen, said housing, and said cover when said cover is moved to said open position.

45. The system as defined in claim 44 wherein said screen is mounted in a frame which is pivotally mounted to one of said cover and said housing, and wherein said housing includes attachment means for securing said housing to the roof of a vehicle such that said housing can be aligned with the centerline of the vehicle with said screen facing rearwardly in said vehicle.

46. The system as defined in claim 45 and further including means coupled to said frame and to said flexible panels for extending said panels when said screen is moved to said use position.

47. A system for the projected display of television signals in a vehicle comprising:

an elongated housing for mounting to a vehicle, said housing including a television signal projector mounted near one end of said elongated housing to project a television image in a straight line in a direction along the length of said housing toward an opposite end of said housing;

a cover mounted to said housing for movement between a closed position and an open position for use of said projector;

a projection screen mounted to said housing near said opposite end for movement between a stored position when said cover is closed and a use position generally orthogonal to said straight line when said cover is open for use of said projector such that the projected television image is projected directly from said projector onto said screen; and walls extending between said cover and said housing for blocking light when said cover is in said open position.

* * * * *

UNITED STATES PATENT AND TRADEMARK OFFICE
CERTIFICATE OF CORRECTION

Page 1 of 2

PATENT NO. : 5,822,023
DATED : October 13, 1998
INVENTOR(S) : Michael J. Suman et al.

It is certified that error appears in the above-identified patent and that said Letters Patent is hereby corrected as shown below:

Column 3, line 4;
"screen 60" should be --screen 63--.

Column 3, line 19;
"screen 60" should be --screen 63--.

Column 3, line 30;
"housing 44" should be --housing 40--.

Column 3, line 43;
"screen 60" should be --screen 63--.

Column 4, line 43;
after "housing" insert --40--.

Column 5, line 16;
after "screen" insert --assembly--.

Column 5, line 32;
"comercially" should be --commercially--.

Column 5, line 39;
"screen 60" should be --screen 63--.

UNITED STATES PATENT AND TRADEMARK OFFICE
CERTIFICATE OF CORRECTION

PATENT NO. : 5,822,023
DATED : October 13, 1998
INVENTOR(S) : Michael J. Suman et al.

It is certified that error appears in the above-identified patent and that said Letters Patent is hereby corrected as shown below:

Column 5, line 62;
   "401" should be --40'--.

Column 6, line 12;
   "screen 60" should be --screen 63--.

Column 6, line 63;
   "three position" should be --three-position--.

Column 10, line 20;
   "mounted" should be --moved--.

Signed and Sealed this

Ninth Day of March, 1999

Attest:

Q. TODD DICKINSON

Attesting Officer

Acting Commissioner of Patents and Trademarks